US011134136B2

(12) United States Patent
Qian et al.

(10) Patent No.: US 11,134,136 B2
(45) Date of Patent: Sep. 28, 2021

(54) INTERACTIVE DEVICE SELECTION METHOD AND APPARATUS

(71) Applicant: Huawei Technologies Co., Ltd., Shenzhen (CN)

(72) Inventors: Li Qian, Shenzhen (CN); Maosheng Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 108 days.

(21) Appl. No.: 15/940,182

(22) Filed: Mar. 29, 2018

(65) Prior Publication Data

US 2018/0219967 A1 Aug. 2, 2018

Related U.S. Application Data

(63) Continuation of application No. PCT/CN2015/091206, filed on Sep. 30, 2015.

(51) Int. Cl.
| | |
|---|---|
| *G06F 15/177* | (2006.01) |
| *H04L 29/08* | (2006.01) |
| *H04B 1/3827* | (2015.01) |
| *H04L 12/24* | (2006.01) |
| *G06F 3/01* | (2006.01) |
| *H04W 4/80* | (2018.01) |

(52) U.S. Cl.
CPC .......... *H04L 67/303* (2013.01); *H04B 1/385* (2013.01); *H04L 41/0803* (2013.01); *H04L 41/16* (2013.01); *H04L 67/12* (2013.01); *G06F 3/011* (2013.01); *H04W 4/80* (2018.02)

(58) Field of Classification Search
CPC ... H04L 67/303; H04L 41/0803; H04L 41/16; H04L 67/12; H04W 4/80; H04B 1/385; H04W 4/80; G06F 3/011
USPC ........................................................ 709/220
See application file for complete search history.

(56) References Cited

U.S. PATENT DOCUMENTS

| | | | |
|---|---|---|---|
| 2006/0255963 A1* | 11/2006 | Thompson | ............. G08C 17/02 340/12.23 |
| 2013/0017789 A1 | 1/2013 | Chi et al. | |
| 2013/0279744 A1 | 10/2013 | Ingrassia, Jr. et al. | |
| 2014/0273849 A1* | 9/2014 | Lee | ..................... H04M 1/7253 455/41.2 |

(Continued)

FOREIGN PATENT DOCUMENTS

| | | |
|---|---|---|
| CN | 103797472 A | 5/2014 |
| CN | 103942021 A | 7/2014 |

(Continued)

*Primary Examiner* — Alan S Chou
(74) *Attorney, Agent, or Firm* — Leydig, Voit & Mayer, Ltd.

(57) ABSTRACT

The present disclosure provides an interactive device selection method and apparatus. The method includes: determining, according to a usage scenario type of the user and a preset policy and from a wearable device set of the user, a first interactive device that matches the usage scenario type of the user; and sending attribute information of the first interactive device to all wearable devices in the wearable device set of the user, so that a wearable device in the wearable device set of the user performs information interaction with the first interactive device according to the attribute information of the first interactive device. Therefore, the user may obtain all required information in a timely manner.

18 Claims, 5 Drawing Sheets

(56) References Cited

U.S. PATENT DOCUMENTS

| | | | |
|---|---|---|---|
| 2015/0130685 A1 | 5/2015 | Kim et al. | |
| 2015/0338926 A1* | 11/2015 | Park | G06F 3/011 345/156 |
| 2015/0341902 A1* | 11/2015 | Ryu | H04W 68/02 455/458 |
| 2016/0094936 A1* | 3/2016 | Yang | H04Q 9/00 455/456.1 |
| 2016/0187965 A1* | 6/2016 | Park | G01C 21/20 345/156 |
| 2016/0192112 A1* | 6/2016 | Sydir | G08B 21/24 340/686.6 |
| 2016/0261147 A1* | 9/2016 | Blum | H02J 50/12 |
| 2016/0266606 A1* | 9/2016 | Ricci | G06F 1/163 |
| 2017/0013241 A1 | 1/2017 | Qian et al. | |
| 2017/0052802 A1* | 2/2017 | Ko | G06F 9/44505 |
| 2017/0178114 A1 | 6/2017 | Levesque et al. | |
| 2017/0262311 A1 | 9/2017 | Yu | |
| 2018/0103447 A1* | 4/2018 | Jain | H04W 64/00 |
| 2018/0114124 A1* | 4/2018 | Cronn | H04W 4/029 |

FOREIGN PATENT DOCUMENTS

| | | |
|---|---|---|
| CN | 104123191 A | 10/2014 |
| CN | 104469662 A | 3/2015 |
| CN | 104679234 A | 6/2015 |
| CN | 104915225 A | 9/2015 |

\* cited by examiner

INTERACTIVE DEVICE SELECTION METHOD AND APPARATUS

CROSS-REFERENCE TO RELATED APPLICATIONS

This application is a continuation of International Application No. PCT/CN2015/091206, filed on Sep. 30, 2015, the disclosure of which is hereby incorporated by reference in its entirety.

TECHNICAL FIELD

Embodiments of the present disclosure relate to communications technologies, and in particular, to an interactive device selection method and apparatus.

BACKGROUND

With development of science and technology, a growing quantity of wearable devices are gradually playing an important role in people's life and provide services for users from different perspectives and at different levels.

Currently, forms of wearable devices are increasingly diverse, and functions of the wearable devices are increasingly abundant. In terms of a device function, a wearable device may be a health manager that checks a body condition of a user, may be an extension to a human organ that helps a user improve a function, or may be an intelligent assistant that assists a user in making a decision. In terms of a device form, a wearable device may be a watch, a mobile phone, a headset, jewelry, clothes, a helmet, shoes, a belt, or the like. When a user simultaneously wears multiple wearable devices, the user needs to perform information interaction with the wearable devices to obtain information required by the user. For example, the user may view each wearable device to obtain information provided by the wearable device. Likewise, the user also needs to input information or send a command to various wearable devices in a manner such as a voice, a text, or a gesture, so as to instruct the wearable devices to obtain the information required by the user.

However, the user needs to view information about each wearable device to obtain all information required by the user. In addition, because of a limited function of devices such as a display screen, a processor, and an audio device, some wearable devices cannot directly perform information interaction with the user. Therefore, when the user forgets to view information about a wearable device, or when the user cannot directly perform information interaction with a wearable device, the user cannot obtain required information in a timely manner, and the user cannot make a correct decision.

SUMMARY

Embodiments of the present disclosure provide an interactive device selection method and apparatus, so that a user can obtain all required information in a timely manner and make a correct decision according to such information.

According to a first aspect, an embodiment of the present disclosure provides an interactive device selection method, including:

determining, according to a current usage scenario type of a user and a preset policy and from a wearable device set of the user, a first interactive device that matches the usage scenario type of the user, where the preset policy includes a correspondence between the usage scenario type of the user and a wearable device; and sending attribute information of the first interactive device to all wearable devices in the wearable device set of the user, so that a wearable device in the wearable device set of the user performs information interaction with the first interactive device according to the attribute information of the first interactive device.

With reference to the first aspect, in a first possible implementation of the first aspect, before the determining, according to a usage scenario type of a user and a preset policy and from a wearable device set of the user, a first interactive device that matches the usage scenario type of the user, the method further includes:

identifying the usage scenario type of the user according to usage scenario information of the user;

determining whether the usage scenario type of the user changes; and if the usage scenario type of the user changes, determining, according to the usage scenario type of the user and the preset policy and from the wearable device set of the user, the first interactive device that matches the usage scenario type of the user.

With reference to the first possible implementation of the first aspect, in a second possible implementation of the first aspect, before the determining the usage scenario type of the user according to usage scenario information of the user, the method further includes:

obtaining a configuration file, where the configuration file includes a correspondence between the usage scenario information of the user and the usage scenario type of the user; and the determining the usage scenario type of the user according to usage scenario information of the user includes:

determining the usage scenario type of the user according to the usage scenario information of the user and the configuration file.

With reference to the first possible implementation of the first aspect, in a third possible implementation of the first aspect, before the determining the usage scenario type of the user according to usage scenario information of the user, the method further includes:

determining, in a machine learning manner, the usage scenario type of the user according to the usage scenario information of the user.

With reference to any one of the first to the third possible implementations of the first aspect, in a fourth possible implementation of the first aspect, after the determining the usage scenario type of the user according to usage scenario information of the user, the method further includes:

determining whether the usage scenario type of the user is saved; and if the usage scenario type of the user is not saved, saving the usage scenario type of the user, and updating the preset policy according to the usage scenario type of the user.

With reference to any one of the first to the fourth possible implementations of the first aspect, in a fifth possible implementation of the first aspect, before the determining the usage scenario type of the user according to usage scenario information of the user, the method includes:

obtaining the usage scenario information of the user by using the wearable device in the wearable device set of the user.

With reference to any one of the first aspect, or the first to the fifth possible implementations of the first aspect, in a sixth possible implementation of the first aspect, before the determining, according to a usage scenario type of a user and a preset policy and from a wearable device set of the user, a first interactive device that matches the usage scenario type of the user, the method further includes:

detecting the wearable device set of the user, so as to determine whether the wearable device set of the user changes; and if a wearable device in the wearable device set of the user changes, determining, according to the usage scenario type of the user and the preset policy and from the detected wearable device set of the user, the first interactive device that matches the usage scenario type of the user.

With reference to any one of the first aspect, or the first to the sixth possible implementations of the first aspect, in a seventh possible implementation of the first aspect, before the sending attribute information of the first interactive device to all wearable devices in the wearable device set of the user, the method further includes:

determining whether the first interactive device is the same device as a second interactive device, where the second interactive device is an interactive device determined according to a previous usage scenario type of the user; and if the first interactive device and the second interactive device are not the same device, sending the attribute information of the first interactive device to all the wearable devices in the wearable device set of the user.

With reference to any one of the first aspect, or the first to the seventh possible implementations of the first aspect, in an eighth possible implementation of the first aspect, the determining, according to a usage scenario type of a user and a preset policy and from a wearable device set of the user, a first interactive device that matches the usage scenario type of the user includes:

determining a priority sequence of all wearable devices in the wearable device set of the user according to the usage scenario type of the user and the preset policy; and determining, from the wearable device set of the user, the first interactive device according to the priority sequence.

With reference to any one of the first aspect, or the first to the eighth possible implementations of the first aspect, in a ninth possible implementation of the first aspect, after the sending attribute information of the first interactive device to all wearable devices in the wearable device set of the user, the method further includes:

receiving a query request sent by any wearable device in the wearable device set of the user, where the query request is used to query the attribute information of the first interactive device; and sending the attribute information of the first interactive device to the wearable device according to the query request.

According to a second aspect, an embodiment of the present disclosure provides an interactive device selection apparatus, including:

a processing module, configured to determine, according to a current usage scenario type of a user and a preset policy and from a wearable device set of the user, a first interactive device that matches the usage scenario type of the user, where the preset policy includes a correspondence between the usage scenario type of the user and a wearable device; and a sending module, configured to send attribute information of the first interactive device to all wearable devices in the wearable device set of the user, so that a wearable device in the wearable device set of the user performs information interaction with the first interactive device according to the attribute information of the first interactive device.

With reference to the second aspect, in a first possible implementation of the second aspect, the processing module is further configured to: identify the usage scenario type of the user according to usage scenario information of the user; and determine whether the usage scenario type of the user changes, and if the usage scenario type of the user changes, determine, according to the usage scenario type of the user and the preset policy and from the wearable device set of the user, the first interactive device that matches the usage scenario type of the user.

With reference to the first possible implementation of the second aspect, in a second possible implementation of the second aspect, the processing module is further configured to obtain a configuration file, where the configuration file includes a correspondence between the usage scenario information of the user and the usage scenario type of the user; and that the processing module is configured to determine the usage scenario type of the user according to usage scenario information of the user includes:

determining the usage scenario type of the user according to the usage scenario information of the user and the configuration file.

With reference to the first possible implementation of the second aspect, in a third possible implementation of the second aspect, that the processing module is configured to determine the usage scenario type of the user according to usage scenario information of the user includes:

determining, in a machine learning manner, the usage scenario type of the user according to the usage scenario information of the user.

With reference to any one of the first to the third possible implementations of the second aspect, in a fourth possible implementation of the second aspect, the processing module is further configured to: determine whether the usage scenario type of the user is saved; and if the usage scenario type of the user is not saved, save the usage scenario type of the user, and update the preset policy according to the usage scenario type of the user.

With reference to any one of the first to the fourth possible implementations of the second aspect, in a fifth possible implementation of the second aspect, the apparatus further includes an obtaining module, configured to obtain the usage scenario information of the user by using the wearable device in the wearable device set of the user.

With reference to any one of the second aspect, or the first to the fifth possible implementations of the second aspect, in a sixth possible implementation of the second aspect, the processing module is further configured to: detect the wearable device set of the user, so as to determine whether the wearable device set of the user changes; and if a wearable device in the wearable device set of the user changes, determine, according to the usage scenario type of the user and the preset policy and from the detected wearable device set of the user, the first interactive device that matches the usage scenario type of the user.

With reference to any one of the second aspect, or the first to the sixth possible implementations of the second aspect, in a seventh possible implementation of the second aspect, the processing module is further configured to: determine whether the first interactive device is the same device as a second interactive device; and if the first interactive device and the second interactive device are not the same device, trigger the sending module to send the attribute information of the first interactive device to all the wearable devices in the wearable device set of the user, where the second interactive device is an interactive device determined according to a previous usage scenario type of the user.

With reference to any one of the second aspect, or the first to the seventh possible implementations of the second aspect, in an eighth possible implementation of the second aspect, that the processing module is configured to determine, according to a usage scenario type of a user and a preset policy and from a wearable device set of the user, a first interactive device that matches the usage scenario type of the user includes:

determining a priority sequence of all wearable devices in the wearable device set of the user according to the usage scenario type of the user and the preset policy; and determining, from the wearable device set of the user, the first interactive device according to the priority sequence.

With reference to any one of the second aspect, or the first to the eighth possible implementations of the second aspect, in a ninth possible implementation of the second aspect, the apparatus further includes a receiving module, configured to receive a query request sent by any wearable device in the wearable device set of the user, where the query request is used to query the attribute information of the first interactive device; and the sending module is further configured to send the attribute information of the first interactive device to the wearable device according to the query request.

According to the interactive device selection method and apparatus that are provided in the embodiments, a controller determines, according to a usage scenario type of a user and a preset policy and from a wearable device set of the user, a first interactive device that matches the usage scenario type of the user, and sends attribute information of the first interactive device to all wearable devices in the wearable device set of the user, so that a wearable device in the wearable device set of the user performs information interaction with the first interactive device according to the attribute information of the first interactive device. In the embodiments, the controller selects, for different usage scenario types of the user, the first interactive device that is suitable for performing information interaction with the user, and the user may obtain, only by using the first interactive device, information collected by all wearable devices worn by the user. In addition, some devices that cannot directly perform information interaction with the user may perform information interaction with the user by using the first interactive device, so that the user can obtain all required information in time and make a correct decision according to such information.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

The method related to the embodiments of the present disclosure is intended to resolve a technical problem in the prior art that when a user forgets to view information about a wearable device, or when a user cannot directly perform information interaction with a wearable device, the user cannot obtain required information in a timely manner, and the user cannot make a correct decision.

The following describes technical solutions of the present disclosure in detail according to specific embodiments. The following specific embodiments may be mutually combined, and same or similar concepts or processes may not be repeatedly described in some embodiments.

Figure 1:
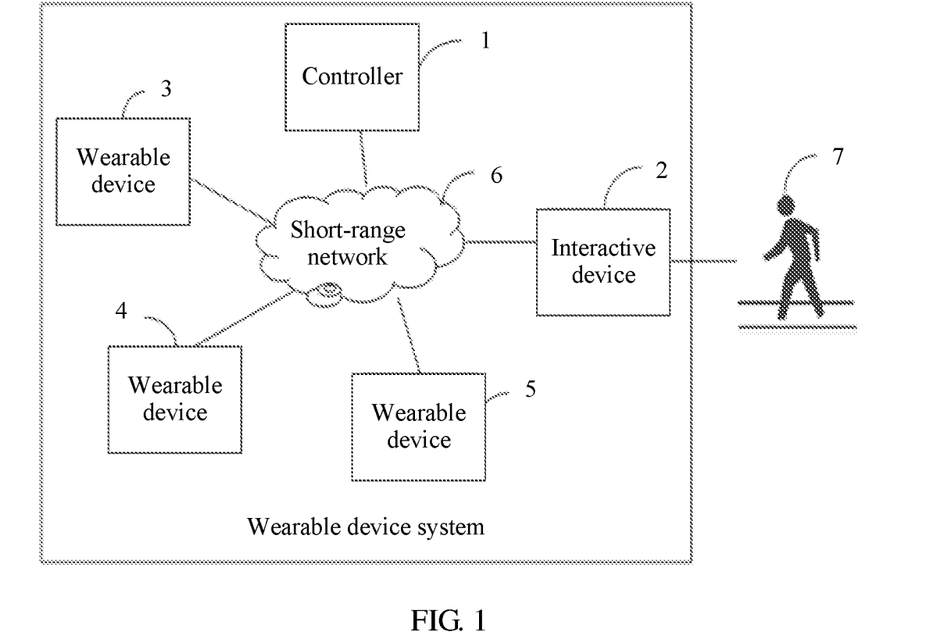
FIG. 1 is a schematic diagram of an application scenario of an interactive device selection method according to an embodiment of the present disclosure.

FIG. 1 is a schematic diagram of an application scenario of an interactive device selection method according to an embodiment of the present disclosure. As shown in FIG. 1, the scenario includes a wearable device system and a user 7. The wearable device system includes a controller 1, an interactive device 2, a wearable device 3, a wearable device 4, a wearable device 5, and a short-range network 6. The interactive device 2, the wearable device 3, the wearable device 4, and the wearable device 5 are various wearable devices worn by the user 7, such as a smart watch, smart glasses, a smart band, a mobile phone, and a vital sign monitoring sensor. In particular, the interactive device 2 is a wearable device that may be configured to represent another wearable device to perform information interaction with the user 7, for example, a mobile phone. The controller 1 is configured to control wearable devices in the wearable device system. The controller 1 is a core device in the wearable device system, and is usually served by a device that has a relatively strong processing capability and communication capability. The controller 1 may be a single physical entity that has a processing function, or may be a module that has a control function and that is superposed on a wearable device, such as a smartphone or a smart watch. These devices come with a function of the controller at delivery, and may be configured by the user. The short-range network 6 may be a short-range wireless network, such as Zigbee, infrared, Bluetooth, or Wireless Fidelity (Wi-Fi for short). All wearable devices in the wearable device system may communicate with each other using the short-range network 6.

Figure 2:
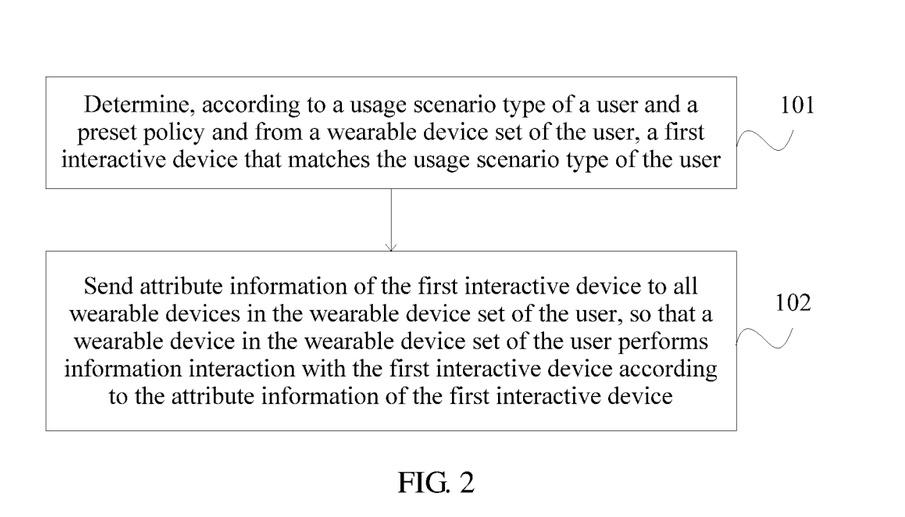
FIG. 2 is a flowchart of an interactive device selection method according to Embodiment 1 of the present disclosure.

FIG. 2 is a flowchart of an interactive device selection method according to Embodiment 1 of the present disclosure. An embodiment relates to a specific process in which a controller selects, in a wearable device system, according to a usage scenario type of a user and a preset policy and from all wearable devices in the wearable device system, an interactive device that matches the usage scenario type of the user, so that another wearable device performs information interaction with the user using the interactive device. As shown in FIG. 2, the method in this embodiment may include:

Step 101: Determine, according to a current usage scenario type of a user and a preset policy and from a wearable device set of the user, a first interactive device that matches the usage scenario type of the user.

The preset policy includes a correspondence between the usage scenario type of the user and a wearable device.

In this embodiment, the controller queries the preset policy, and selects, from the wearable device set of the user, the first interactive device that matches the usage scenario type of the user; that is, in a usage scenario of the user, the first interactive device is most suitable for performing information interaction with the user.

The usage scenario type of the user may be identified according to environment information of a scenario of the user and activity information of the user. For example, whether day or night is determined according to light intensity, and whether the user runs, takes a bus, or is still is determined according to a moving speed of the user. The first interactive device is configured to represent another device in the wearable device system to perform information interaction with the user, and the information interaction includes: the first interactive device receives information output by the another wearable device to the user, and presents the information to the user in a suitable manner; or the first interactive device receives a device execution command sent by the user, parses the command, and forwards content of the command to a corresponding wearable device for execution. The user may set the preset policy according to a requirement and a preference that are of the user, or the controller may generate the preset policy in a machine learning manner to match, for each usage scenario of the user, the first interactive device that is most suitable for displaying the information to the user. For example, the preset policy may include: if the usage scenario type of the user is outdoor running, the matching first interactive device is smart glasses; or if the usage scenario type of the user is indoor meditation, the matching first interactive device is a mobile phone. The wearable device set of the user includes a wearable device currently worn by the user, for example, the wearable device set of the user is {a mobile phone, a watch, glasses, a band}. If a device in the wearable device system leaves or another device is added to the wearable device system, the controller may update the wearable device set of the user in real time.

Step 102: Send attribute information of the first interactive device to all wearable devices in the wearable device set of the user, so that a wearable device in the wearable device set of the user performs information interaction with the first interactive device according to the attribute information of the first interactive device.

In this embodiment, after determining the first interactive device, the controller broadcasts, in the wearable device system, the attribute information of the first interactive device, so that another device in the wearable device system can perform information interaction with the first interactive device according to the attribute information of the first interactive device, and then the first interactive device sends information to the user or receives instruction information sent by the user. For example, the first interactive device is a mobile phone. When a thermometer needs to display body temperature information of the user to the user, the thermometer may send the body temperature information of the user to the mobile phone, and then the mobile phone displays the body temperature information of the user to the user in a manner such as by text or a voice.

According to the interactive device selection method provided in this embodiment, a controller determines, according to a usage scenario type of a user and a preset policy and from a wearable device set of the user, a first interactive device that matches the usage scenario type of the user, and sends attribute information of the first interactive device to all wearable devices in the wearable device set of the user, so that a wearable device in the wearable device set of the user performs information interaction with the first interactive device according to the attribute information of the first interactive device. In this embodiment, the controller may select, for different usage scenario types of the user, the first interactive device that is suitable for performing information interaction with the user, and the user may obtain, only by using the first interactive device, information collected by all wearable devices worn by the user. In addition, some devices that cannot directly perform information interaction with the user may perform information interaction with the user by using the first interactive device, so that the user can obtain all required information in a timely manner and make a correct decision according to such information.

Figure 3A:
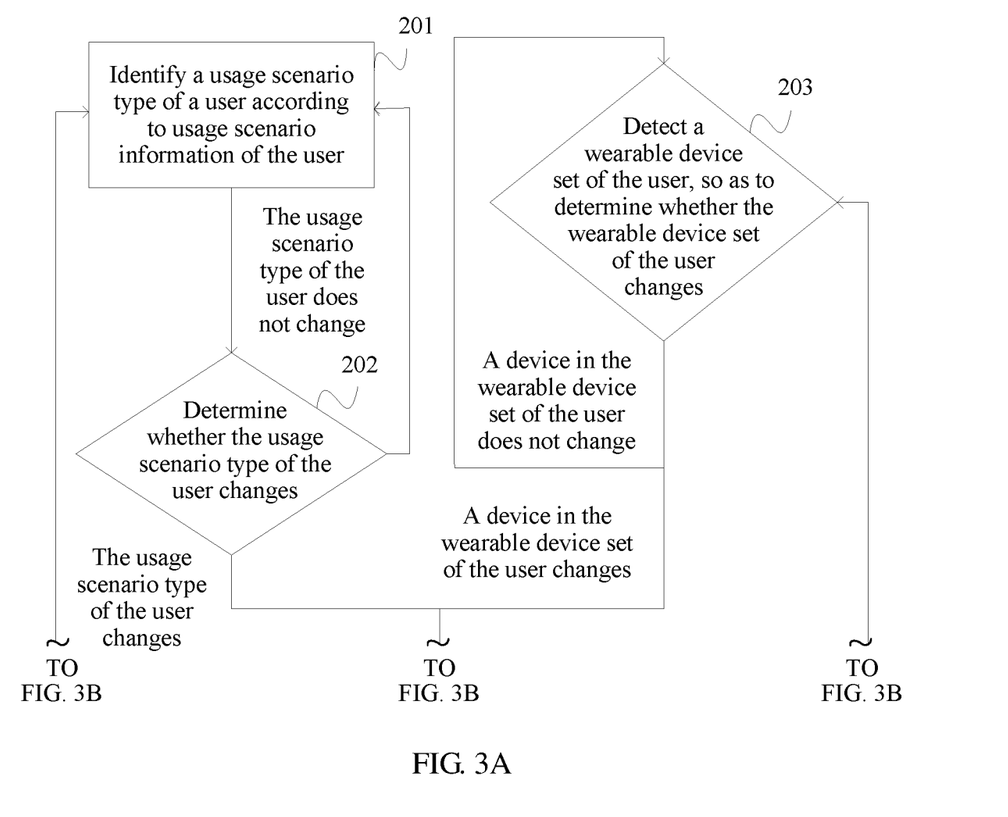
FIG. 3A and FIG. 3B are a flowchart of an interactive device selection method according to Embodiment 2 of the present disclosure.
Figure 3B:
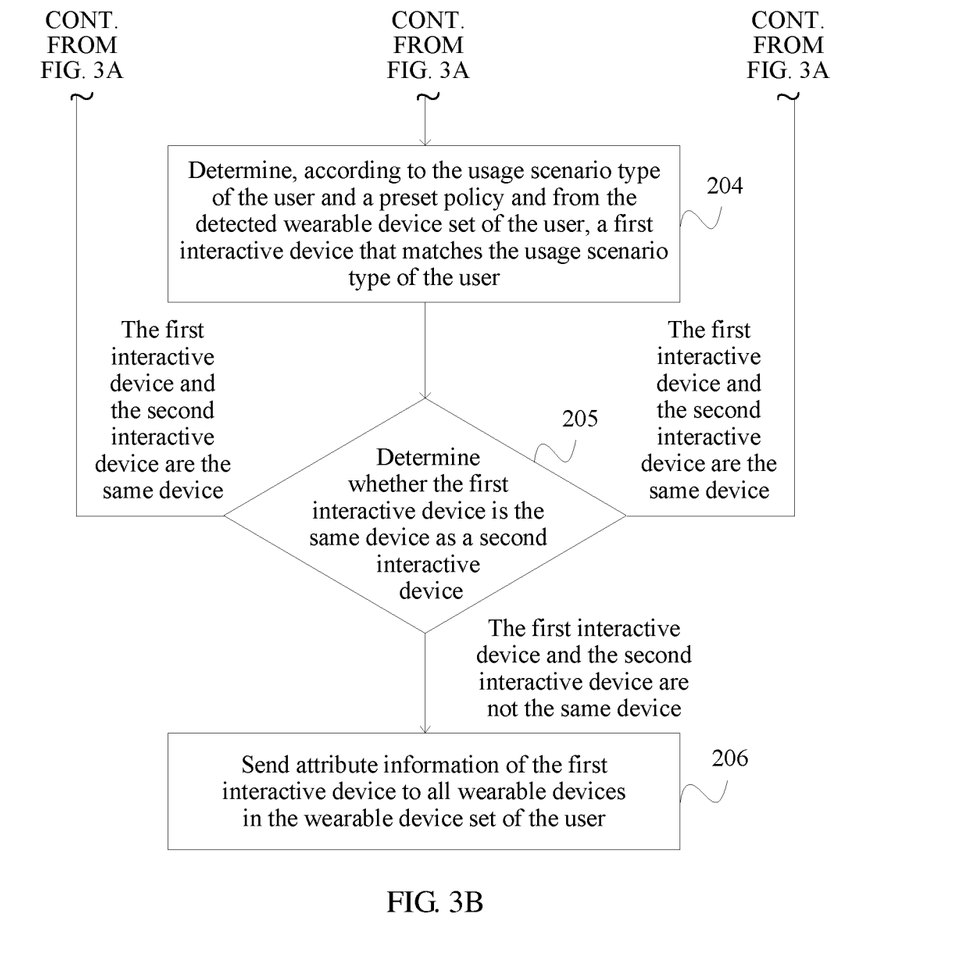

FIG. 3A and FIG. 3B are a flowchart of an interactive device selection method according to Embodiment 2 of the present disclosure. An embodiment relates to a specific process in which when a specific trigger condition is met, a controller selects, according to a current usage scenario type of a user and a preset policy, an interactive device to perform information interaction with the user. As shown in FIG. 3A and FIG. 3B, the method includes the following steps:

Step 201: Identify a usage scenario type of a user according to usage scenario information of the user.

In this embodiment, the usage scenario information of the user includes ambient environment information of the user and activity information of the user, such as light intensity, line-of-sight tracing information, a wrist swing frequency, step counting information, noise, and body temperature. The usage scenario type of the user may include a current activity type of the user and an ambient environment type, for example, the current activity type of the user may be listening to music, running, sleeping, fever, or the like, and the ambient environment type may be indoor, outdoor, day, night, or the like. The controller obtains the usage scenario information of the user using a wearable device worn by the user, and determines the usage scenario type of the user according to the usage scenario information of the user, for example, whether the current activity type of the user is running, still, or walking may be determined according to the wrist swing frequency and the step counting information, and whether the ambient environment type is day or night may be determined according to the light intensity.

Step 202: Determine whether the usage scenario type of the user changes; and if the usage scenario type of the user changes, perform step 204, or if the usage scenario type of the user does not change, return to step 201.

In this embodiment, when the usage scenario type of the user changes, the controller selects a first interactive device according to the usage scenario type of the user and the preset policy; or when the usage scenario type of the user does not change, the controller continues to identify the usage scenario type of the user.

Optionally, a change of a device in a wearable device set of the user is another condition for triggering the controller to select the first interactive device. A specific implementation is shown in step 203 and step 204.

Step 203: Detect a wearable device set of the user, so as to determine whether the wearable device set of the user changes; and if a device in the wearable device set of the user changes, perform step 204, or if a device in the wearable device set of the user does not change, return to step 203.

In this embodiment, when the device in the wearable device set of the user changes, the controller selects the first interactive device according to the usage scenario type of the user and the preset policy; or when the device in the wearable device set of the user does not change, the controller continues to detect the wearable device set of the user. The change of the device in the wearable device set of the user includes: a device in a wearable device system leaves or some devices are added to a wearable device system. In particular, the change refers to leaving of the first interactive device, for example, the first interactive device runs out of power, the user no longer wears the first interactive device, or the user wears another new wearable device.

It should be noted that the condition for triggering the controller to select the first interactive device includes a change of the usage scenario type of the user, and/or the change of the device in the wearable device set of the user. When either of these two trigger conditions is met or both trigger conditions are met, the controller may be triggered to perform step 204.

Optionally, the controller may update the wearable device set of the user in real time according to a status, such as leaving, a failure, or addition of the device in the wearable device system, so that the controller can select an interactive device that is most suitable for performing information interaction with the user in a usage scenario of the user.

Step 204: Determine, according to the usage scenario type of the user and a preset policy and from the wearable device set of the user, a first interactive device that matches the usage scenario type of the user.

The preset policy includes a correspondence between the usage scenario type of the user and a wearable device, and the wearable device set of the user includes a wearable device currently used by the user.

Step 205: Determine whether the first interactive device is the same device as a second interactive device; and if the first interactive device and the second interactive device are not the same device, perform step 206, or if the first interactive device and the second interactive device are the same device, perform step 201 and/or perform step 203.

The second interactive device is an interactive device determined according to a previous usage scenario type of the user.

In this embodiment, in different usage scenario types of the user, if the first interactive device and the second interactive device are the same device, there is no need to send a broadcast message to devices in the wearable device set of the user; or if the first interactive device and the second interactive device are not the same device, the controller sends attribute information of the first interactive device to all wearable devices in the wearable device set of the user.

Step 206: Send attribute information of the first interactive device to all wearable devices in the wearable device set of the user.

According to the interactive device selection method provided in this embodiment, a controller periodically or aperiodically identifies a usage scenario type of a user, and detects a wearable device set of the user. When the usage scenario type of the user changes and/or a device in a wearable device set of the user changes, the controller determines, according to the usage scenario type of the user and a preset policy and from the detected wearable device set of the user, a first interactive device that matches changed usage scenario information of the user, and determines whether the first interactive device is the same device as a second interactive device. If the first interactive device and the second interactive device are not the same device, the controller sends attribute information of the first interactive device to all wearable devices in the wearable device set of the user, so as to ensure that information about a wearable device is displayed, in an optimal manner, to the user in real time, and the user can easily manage devices in a wearable device system.

Figure 4:
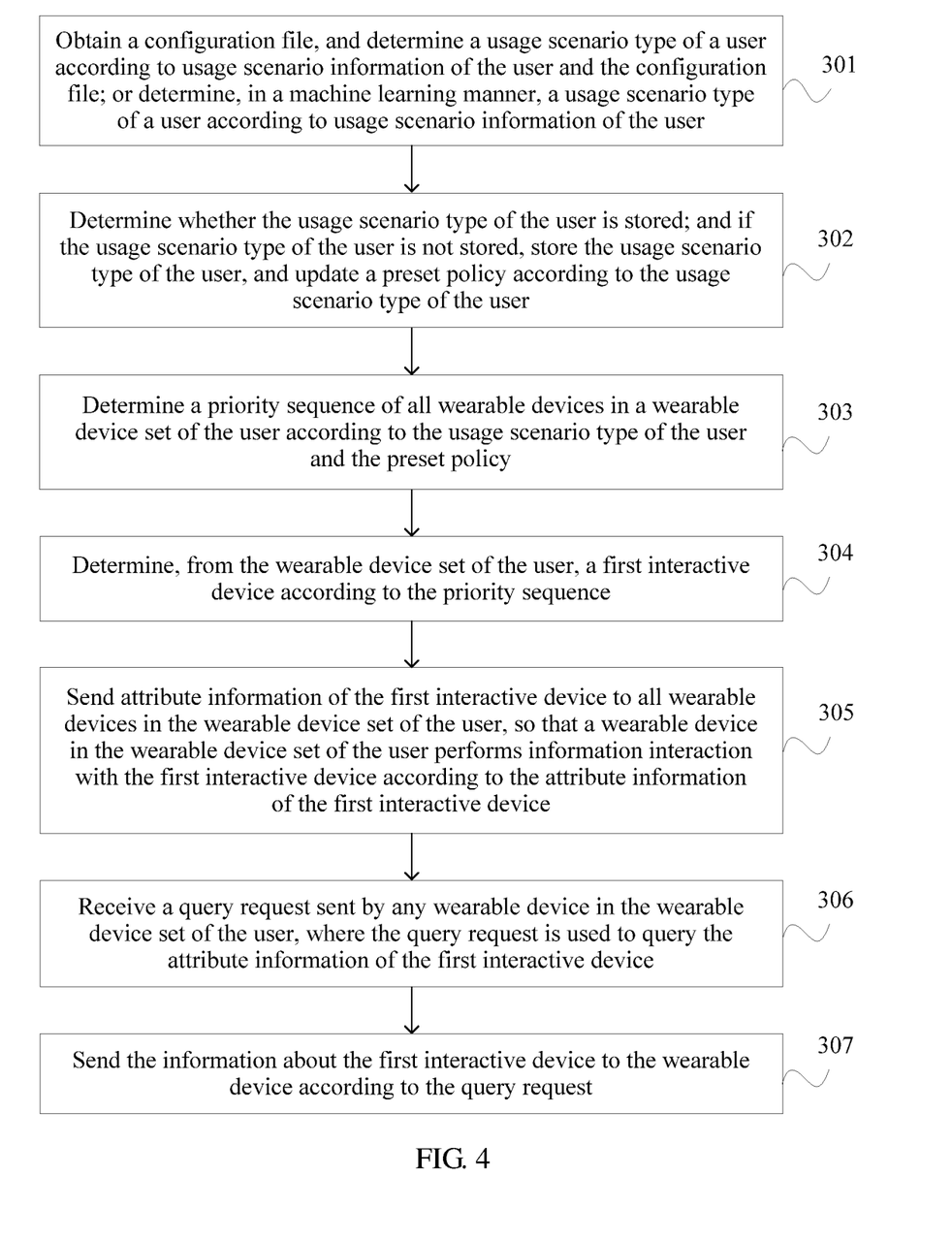
FIG. 4 is a flowchart of an interactive device selection method according to Embodiment 3 of the present disclosure.

FIG. 4 is a flowchart of an interactive device selection method according to Embodiment 3 of the present disclosure. As shown in FIG. 4, the method includes the following steps:

Step 301: Obtain a configuration file, and determine a usage scenario type of a user according to usage scenario information of the user and the configuration file; or determine, in a machine learning manner, a usage scenario type of a user according to usage scenario information of the user.

The configuration file includes a correspondence between the usage scenario information of the user and the usage scenario type of the user.

In this embodiment, the usage scenario type of the user may be determined by using a predefined configuration file in a conventional rule matching manner. The configuration file may specify a mapping relationship between the usage scenario type of the user and a threshold of a context parameter corresponding to the usage scenario information of the user. For example, when light intensity is between 10,00 lx and 10,000 lx, a corresponding usage scenario type of the user is day and outdoor; or when light intensity is between 100 lx and 550 lx, a corresponding usage scenario type of the user is day and indoor; or when light intensity is less than 0.2 lx, a corresponding usage scenario type of the user is night and outdoor.

In this embodiment, alternatively, the usage scenario type of the user may be determined in the machine learning manner. For example, the usage scenario type of the user is determined by using an algorithm, such as a decision tree, a Support Vector Machine (SVM), Apriori, expectation maximization (EM for short), a Bayes classifier, classification, or a regression tree. Specifically, the decision tree algorithm is used as an example to describe in detail a solution in this embodiment: A scenario model is established for each usage scenario type of the user by using a specific quantity of training data sets, the usage scenario information of the user is input to the scenario model for operation, and the usage scenario type of the user is determined by using an operation result. For example, if a scenario model corresponding to a usage scenario type A of the user is M, data corresponding to the usage scenario information of the user is S, and S is input to the model M, whether a usage scenario type of the user is A is determined according to output of M. If the usage scenario type of the user is A, the usage scenario type of the user determined according to the usage scenario information of the user is A; or if the usage scenario type of the user is not A, another scenario model may be tried.

It should be noted that step 301 in this embodiment is a specific implementation of step 101 in this embodiment shown in FIG. 2.

Optionally, before step 301, the method may further include obtaining the usage scenario information of the user by using a wearable device in a wearable device set of the user.

In this embodiment, a controller collects usage scenario information of a user according to a preset time period or aperiodically, or a controller may obtain usage scenario information of a user by using a sensor on a wearable device, so as to more comprehensively and accurately obtain the usage scenario information of the user. For example, the usage scenario information of the user is obtained by using a light sensor or a temperature sensor on a vital sign tester, the Global Positioning System (GPS) on a mobile phone or a vehicle, a microphone on a mobile phone, or the like.

Step 302: Determine whether the usage scenario type of the user is saved; and if the usage scenario type of the user is not saved, save the usage scenario type of the user, and update a preset policy according to the usage scenario type of the user.

In this embodiment, if a controller obtains usage scenario information of a user in real time, and identifies, according to the usage scenario information of the user, that a usage scenario type of the user is not a previously saved usage scenario type of the user, the controller saves the new usage scenario type of the user in a manner such as a database, a document, or a table, and updates a preset policy to match, based on the new usage scenario type of the user, an interactive device that is suitable for performing information interaction with the user, so as to improve accuracy of identifying a usage scenario. For example, if a value of the usage scenario information of the user is not within a threshold that is of a context parameter and that is specified in a configuration file, or if a value of the usage scenario information of the user includes new data, it indicates that the usage scenario type of the user is a new scenario type. Alternatively, the usage scenario information of the user is input to all scenario models in a machine learning manner, and if input results do not match any previously saved usage scenario type of the user, it indicates that the usage scenario type of the user is a new scenario type.

Step 303: Determine a priority sequence of all wearable devices in a wearable device set of the user according to the usage scenario type of the user and the preset policy.

Step 304: Determine, from the wearable device set of the user, a first interactive device according to the priority sequence.

In this embodiment, for different usage scenario types of the user, different priorities may be set for all devices in the wearable device set of the user according to the preset policy, and the first interactive device is determined from the wearable device set of the user according to the priority sequence. Table 1 shows an example of a policy for prioritizing all devices in a wearable device set of a user. The following uses Table 1 as an example to describe in detail technical solutions of step 303 and step 304.

TABLE 1

| Usage scenario type of a user | Priority sequence of devices |
|---|---|
| Outdoor exercise | 1. Glasses; 2. Watch; 3. Band; 4. Mobile phone |
| Watching a movie at a cinema | 1. Glasses; 2. Watch; 3. Band; 4. Mobile phone |
| Sleeping | 1. Watch; 2. Band; 3. Mobile phone; 4. Glasses |
| Driving | 1. Vehicle-mounted display; 2. Glasses; 3. Watch; 4. Band; 5. Mobile phone |
| Watching TV indoors | 1. Television; 2. Glasses; 3. Mobile phone; 4. Watch |
| Working indoors | 1. Tabletop content display; 2. Mobile phone; 3. Watch |
| . . . | . . . |

As shown in Table 1, Table 1 includes several usage scenario types of the user and corresponding priority sequences of all devices in the wearable device set of the user. A device with a relatively small sequence number has a relatively high priority. After identifying a current usage scenario type of the user, the controller may determine a priority sequence of all wearable devices in the wearable device set of the user by using the preset policy, and preferentially select a wearable device with a relatively high priority as the first interactive device. For example, after identifying that the current usage scenario type of the user is the "outdoor exercise", the controller determines, according to the preset policy, that a priority sequence of all devices in the wearable device set of the user is "1. Glasses; 2. Watch; 3. Band; 4. Mobile phone", and may determine, according to the priority sequence, that the "glasses" are the selected first interactive device. If the glasses fail, the controller may further select the watch as the first interactive device, so as to ensure that required information is provided to the user in time.

It should be noted that step 303 and step 304 in this embodiment are a specific implementation of step 102 in this embodiment shown in FIG. 2.

Step 305: Send attribute information of the first interactive device to all wearable devices in the wearable device set of the user, so that a wearable device in the wearable device set of the user performs information interaction with the first interactive device according to the attribute information of the first interactive device.

Optionally, in this embodiment, if some wearable devices do not receive, for a long time, the attribute information that is of the first interactive device and that is sent by the controller because signal strength is relatively poor, the method may further include the following steps:

Step 306: Receive a query request sent by any wearable device in the wearable device set of the user, where the query request is used to query the attribute information of the first interactive device.

Step 307: Send the information about the first interactive device to the wearable device according to the query request.

In this embodiment, when another wearable device other than a first interactive device in a wearable device set does not receive attribute information of the first interactive device for a long time, and needs to perform information interaction with a user, the another wearable device may first send a query request to a controller to query information about a current interactive device that performs information interaction with the user, and the controller sends the information about the first interactive device to the another wearable device, so that the another wearable device performs information interaction with the first interactive device according to the attribute information of the first interactive device, thereby avoiding a problem that when the wearable device does not receive the attribute information that is of the first interactive device and that is sent by the controller, the another wearable device cannot learn a specific wearable device that performs information interaction with the user.

According to the interactive device selection method provided in this embodiment, a controller obtains a configuration file, and determines a usage scenario type of a user according to usage scenario information of the user and the configuration file; or a controller determines, in a machine learning manner, a usage scenario type of a user according to usage scenario information of the user, and determines whether the usage scenario type of the user is saved; and if the usage scenario type of the user is not saved, the controller saves the usage scenario type of the user, and updates a preset policy according to the usage scenario type of the user, so as to more comprehensively and accurately obtain the usage scenario information of the user, and improve accuracy of identifying the usage scenario type of the user; and the controller determines a priority sequence of all wearable devices in a wearable device set of the user according to the usage scenario type of the user and the preset policy, determines, from the wearable device set of the user, a first interactive device according to the priority sequence, and sends attribute information of the first interactive device to all wearable devices in the wearable device set of the user, so as to ensure that required information is provided to the user in time. In addition, when receiving a query request sent by any wearable device in the wearable device set of the user, the controller sends the information about the first interactive device to the wearable device, thereby avoiding a problem that when the wearable device does not receive the attribute information that is of the first interactive device and that is sent by the controller, the wearable device cannot learn a specific wearable device that performs information interaction with the user.

Figure 5:
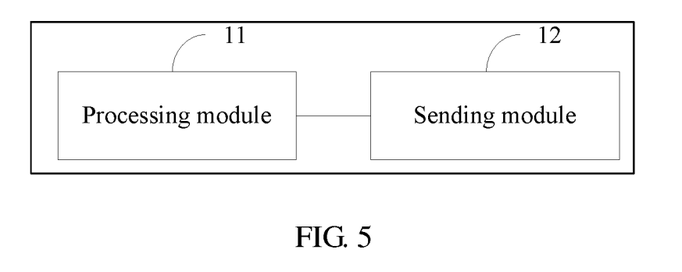
FIG. 5 is a schematic structural diagram of an interactive device selection apparatus according to Embodiment 4 of the present disclosure.

FIG. 5 is a schematic structural diagram of an interactive device selection apparatus according to Embodiment 4 of the present disclosure. As shown in FIG. 5, the apparatus includes a processing module 11 and a sending module 12. The processing module 11 is configured to determine, according to a usage scenario type of a user and a preset policy and from a wearable device set of the user, a first interactive device that matches the usage scenario type of the user, where the preset policy includes a correspondence between the usage scenario type of the user and a wearable device, and the wearable device set of the user includes a wearable device currently used by the user. The sending module 12 is configured to send attribute information of the first interactive device to all wearable devices in the wearable device set of the user, so that a wearable device in the wearable device set of the user performs information interaction with the first interactive device according to the attribute information of the first interactive device.

In this embodiment, the apparatus may be configured to perform the technical solution in the method embodiment shown in FIG. 2. An implementation principle and a technical effect of the apparatus are similar to those of the embodiment shown in FIG. 2, and details are not described herein again.

Further, the processing module 11 is further configured to: identify the usage scenario type of the user according to usage scenario information of the user; and determine whether the usage scenario type of the user changes, and if the usage scenario type of the user changes, determine, according to the usage scenario type of the user and the preset policy and from the wearable device set of the user, the first interactive device that matches the usage scenario type of the user.

Optionally, the processing module 11 is further configured to: detect the wearable device set of the user, so as to determine whether the wearable device set of the user changes; and if a wearable device in the wearable device set of the user changes, determine, according to the usage scenario type of the user and the preset policy and from the detected wearable device set of the user, the first interactive device that matches the usage scenario type of the user.

Optionally, the processing module 11 is further configured to: determine whether the first interactive device is the same device as a second interactive device; and if the first interactive device and the second interactive device are not the same device, trigger the sending module 12 to send the attribute information of the first interactive device to all the wearable devices in the wearable device set of the user, where the second interactive device is an interactive device determined according to a previous usage scenario type of the user.

In this embodiment, the apparatus may be configured to perform the technical solution in the method embodiment shown in FIG. 3A and FIG. 3B. An implementation principle and a technical effect of the apparatus are similar to those of the embodiment shown in FIG. 3A and FIG. 3B, and details are not described herein again.

Figure 6:
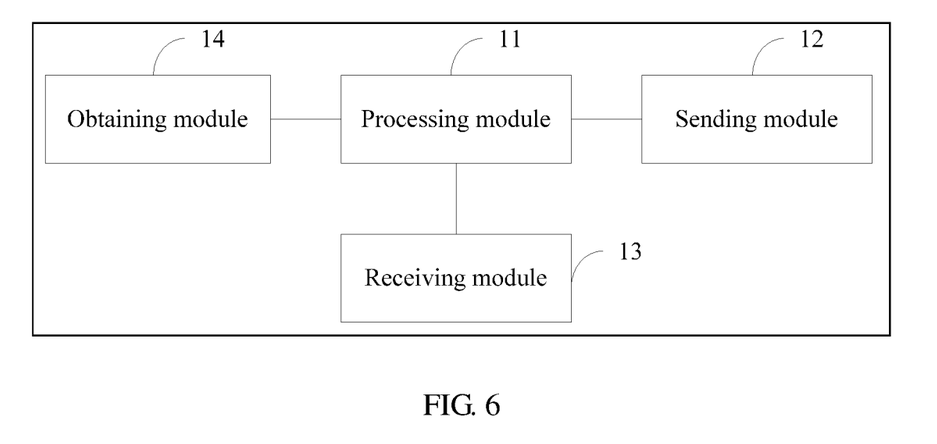
FIG. 6 is a schematic structural diagram of an interactive device selection apparatus according to Embodiment 5 of the present disclosure.

FIG. 6 is a schematic structural diagram of an interactive device selection apparatus according to Embodiment 5 of the present disclosure. As shown in FIG. 6, the apparatus further includes a receiving module 13 and an obtaining module 14. The receiving module 13 is configured to receive a query request sent by any wearable device in the wearable device set of the user, where the query request is used to query the attribute information of the first interactive device. The sending module 12 is further configured to send the attribute information of the first interactive device to the wearable device according to the query request. The obtaining module 14 is configured to obtain the usage scenario information of the user by using the wearable device in the wearable device set of the user.

Optionally, that the processing module 11 is configured to determine, according to a usage scenario type of a user and a preset policy and from a wearable device set of the user, a first interactive device that matches the usage scenario type of the user includes: determining a priority sequence of all devices in the wearable device set of the user according to the usage scenario type of the user and the preset policy; and determining, from the wearable device set of the user, the first interactive device according to the priority sequence.

Optionally, the processing module 11 is further configured to obtain a configuration file, where the configuration file includes a correspondence between the usage scenario information of the user and the usage scenario type of the user; and that the processing module 11 is configured to determine the usage scenario type of the user according to usage scenario information of the user includes: determining the usage scenario type of the user according to the usage scenario information of the user and the configuration file.

Optionally, that the processing module 11 is configured to determine the usage scenario type of the user according to usage scenario information of the user includes: determining, in a machine learning manner, the usage scenario type of the user according to the usage scenario information of the user.

Optionally, the processing module 11 is further configured to: determine whether the usage scenario type of the user is saved; and if the usage scenario type of the user is not saved, save the usage scenario type of the user, and update the preset policy according to the usage scenario type of the user.

In this embodiment, the apparatus may be configured to perform the technical solution in the method embodiment shown in FIG. 4. An implementation principle and a technical effect of the apparatus are similar to those of the embodiment shown in FIG. 4, and details are not described herein again.

Figure 7:
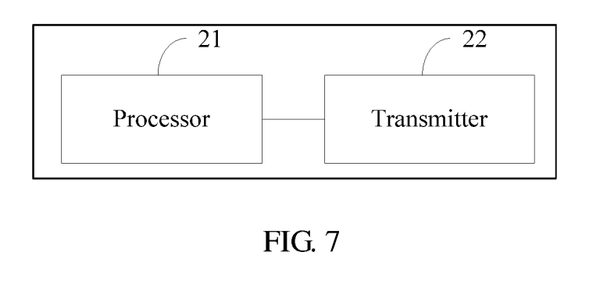
FIG. 7 is a schematic structural diagram of a controller according to Embodiment 6 of the present disclosure.

FIG. 7 is a schematic structural diagram of a controller according to Embodiment 6 of the present disclosure. As shown in FIG. 7, the controller includes a processor 21 and a transmitter 22. The processor 21 is configured to determine, according to a usage scenario type of a user and a preset policy and from a wearable device set of the user, a first interactive device that matches the usage scenario type of the user, where the preset policy includes a correspondence between the usage scenario type of the user and a wearable device. The transmitter 22 is configured to send attribute information of the first interactive device to all wearable devices in the wearable device set of the user, so that a wearable device in the wearable device set of the user performs information interaction with the first interactive device according to the attribute information of the first interactive device.

In this embodiment, the apparatus may be configured to perform the technical solution in the method embodiment shown in FIG. 2. An implementation principle and a technical effect of the apparatus are similar to those of the embodiment shown in FIG. 2, and details are not described herein again.

Further, the processor 21 is further configured to: identify the usage scenario type of the user according to usage scenario information of the user; and determine whether the usage scenario type of the user changes, and if the usage scenario type of the user changes, determine, according to the usage scenario type of the user and the preset policy and from the wearable device set of the user, the first interactive device that matches the usage scenario type of the user.

Optionally, the processor 21 is further configured to: detect the wearable device set of the user, so as to determine whether the wearable device set of the user changes; and if the device in the wearable device set of the user changes, determine, according to the usage scenario type of the user and the preset policy and from the detected wearable device set of the user, the first interactive device that matches the usage scenario type of the user.

Optionally, the processor 21 is further configured to: determine whether the first interactive device is the same device as a second interactive device; and if the first interactive device and the second interactive device are not the same device, trigger the transmitter 22 to send the attribute information of the first interactive device to all the wearable devices in the wearable device set of the user, where the second interactive device is an interactive device determined according to a previous usage scenario type of the user.

In this embodiment, the apparatus may be configured to perform the technical solution in the method embodiment shown in FIG. 3A and FIG. 3B. An implementation principle and a technical effect of the apparatus are similar to those of the embodiment shown in FIG. 3A and FIG. 3B, and details are not described herein again.

Figure 8:
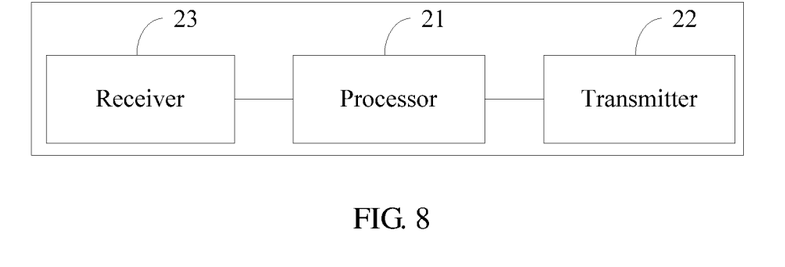
FIG. 8 is a schematic structural diagram of a controller according to Embodiment 7 of the present disclosure.

FIG. 8 is a schematic structural diagram of a controller according to Embodiment 7 of the present disclosure. As shown in FIG. 8, the controller further includes a receiver 23, configured to receive a query request sent by any wearable device in the wearable device set of the user, where the query request is used to query the attribute information of the first interactive device; and the transmitter 22 is further configured to send the attribute information of the first interactive device to the wearable device according to the query request.

Optionally, that the processor 21 is configured to determine, according to a usage scenario type of a user and a preset policy and from a wearable device set of the user, a first interactive device that matches the usage scenario type of the user includes: determining a priority sequence of all wearable devices in the wearable device set of the user according to the usage scenario type of the user and the preset policy; and determining, from the wearable device set of the user, the first interactive device according to the priority sequence.

Optionally, the processor 21 is further configured to obtain a configuration file, where the configuration file includes a correspondence between the usage scenario information of the user and the usage scenario type of the user; and that the processor 21 is configured to determine the usage scenario type of the user according to usage scenario information of the user includes: determining the usage scenario type of the user according to the usage scenario information of the user and the configuration file.

Optionally, that the processor 21 is configured to determine the usage scenario type of the user according to usage scenario information of the user includes: determining, in a machine learning manner, the usage scenario type of the user according to the usage scenario information of the user.

Optionally, the processor 21 is further configured to determine whether the usage scenario type of the user is saved; and if the usage scenario type of the user is not saved, save the usage scenario type of the user, and update the preset policy according to the usage scenario type of the user.

Optionally, the processor 21 is further configured to obtain the usage scenario information of the user by using the wearable device in the wearable device set of the user.

In this embodiment, the apparatus may be configured to perform the technical solution in the method embodiment shown in FIG. 4. An implementation principle and a technical effect of the apparatus are similar to those of the embodiment shown in FIG. 4, and details are not described herein again.

Persons of ordinary skill in the art may understand that all or some of the steps of the method embodiments may be implemented by a program instructing relevant hardware. The program may be saved in a computer-readable storage medium. When the program runs, the steps of the method embodiments are performed. The foregoing storage medium includes: any medium that can save program code, such as a read-only memory (Read-Only Memory, ROM for short), a random access memory (random access memory, RAM for short), a magnetic disk, or an optical disc.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. An interactive device selection method, the method comprising:
    identifying a usage scenario type of a user according to usage scenario information of the user;
    determining a first interactive device from a wearable device set of the user according to a priority sequence of wearable devices in the wearable device set of the user, the priority sequence based on the usage scenario type of the user and a preset policy, wherein the wearable device set of the user comprises a plurality of wearable devices, and wherein the preset policy comprises a correspondence between the usage scenario type of the user and each wearable device in the wearable device set of the user;
    sending attribute information of the first interactive device to a wearable device in the wearable device set of the user, so that the wearable device in the wearable device set of the user performs information interaction with the first interactive device according to the attribute information of the first interactive device;
    determining whether the usage scenario type of the user changes to a different usage scenario type of the user;
    in response to the usage scenario type of the user changing to the different usage scenario type of the user, determining, according to the priority sequence and the different usage scenario type of the user, a new first interactive device from the wearable device set of the user; and
    sending attribute information of the new first interactive device to other wearable devices in the wearable device set of the user.

2. The method according to claim 1 before the identifying the usage scenario type of the user according to usage scenario information of the user, the method further comprises:
    obtaining a configuration file, wherein the configuration file comprises a correspondence between the usage scenario information of the user and the usage scenario type of the user; and
    the identifying the usage scenario type of the user according to usage scenario information of the user comprises:
    determining the usage scenario type of the user according to the usage scenario information of the user and the configuration file.

3. The method according to claim 1, before the identifying the usage scenario type of the user according to usage scenario information of the user, the method further comprises:
    determining, in a machine learning manner, the usage scenario type of the user according to the usage scenario information of the user.

4. The method according to claim 1, after the identifying the usage scenario type of the user according to usage scenario information of the user, the method further comprises:
    determining whether the usage scenario type of the user is saved; and
    if the usage scenario type of the user is not saved, saving the usage scenario type of the user, and updating the preset policy according to the usage scenario type of the user.

5. The method according to claim 1, before the identifying the usage scenario type of the user according to usage scenario information of the user, the method comprises:
    obtaining the usage scenario information of the user using the wearable device in the wearable device set of the user.

6. The method according to claim 1, wherein the method further comprises:
    detecting the wearable device set of the user, so as to determine whether the wearable device set of the user changes; and
    if a wearable device in the wearable device set of the user changes, re-determining, according to the usage scenario type of the user and the preset policy, the first interactive device from the detected wearable device set of the user, wherein the first interactive device is a wearable device in the detected wearable device set of the user that matches the usage scenario type of the user.

7. The method according to claim 1, wherein before the sending attribute information of the first interactive device to all other wearable devices in the wearable device set of the user, the method further comprises:
    determining whether the first interactive device is the same device as a second interactive device, wherein the second interactive device is an interactive device determined according to a previous usage scenario type of the user; and
    if the first interactive device and the second interactive device are not the same device, sending the attribute information of the first interactive device to all the other wearable devices in the wearable device set of the user.

8. The method according to claim 1, wherein the determining a first interactive device comprises:
    determining the priority sequence of all wearable devices in the wearable device set of the user according to the usage scenario type of the user and the preset policy; and
    determining, from the wearable device set of the user, the first interactive device according to the priority sequence.

9. The method according to claim 1, wherein after the sending attribute information of the first interactive device to all other wearable devices in the wearable device set of the user, the method further comprises:
    receiving a query request sent by at least one wearable device in the wearable device set of the user, wherein the query request is used to query the attribute information of the first interactive device; and
    sending the attribute information of the first interactive device to the at least one wearable device according to the query request.

10. An interactive device selection apparatus, comprising:
    a processor configured to:
    identify a usage scenario type of a user according to usage scenario information of the user; and
    determine a first interactive device from a wearable device set of the user according to a priority sequence of wearable devices in the wearable device set of the user, the priority sequence based on the usage scenario type of the user and a preset policy, wherein the wearable device set of the user comprises a plurality of wearable devices, and wherein the preset policy comprises a correspondence between the usage scenario type of the user and each wearable device in the wearable device set of the user; and
    a transmitter, configured to send attribute information of the first interactive device to a wearable devices in the wearable device set of the user, so that the wearable device in the wearable device set of the user performs information interaction with the first interactive device according to the attribute information of the first interactive device;

wherein the processor is further configured to determine whether the usage scenario type of the user changes to a different usage scenario type of the user; and in response to the usage scenario type of the user changing to the different usage scenario type of the user, determine, according to the priority sequence and the different usage scenario type of the user, a new first interactive device from the wearable device set of the user; and wherein the transmitter is further configured to send attribute information of the new first interactive device to other wearable devices in the wearable device set of the user.

11. The apparatus according to claim 10, wherein the processor is further configured to obtain a correspondence between the usage scenario information of the user and the usage scenario type of the user; and determine the usage scenario type of the user according to the usage scenario information of the user and the configuration file.

12. The apparatus according to claim 10, wherein that the processor is configured to identify the usage scenario type of the user according to usage scenario information of the user comprises that the processor is configured to:

determine, in a machine learning manner, the usage scenario type of the user according to the usage scenario information of the user.

13. The apparatus according to claim 10, wherein:

the processor is further configured to: determine whether the usage scenario type of the user is saved to a memory; and if the usage scenario type of the user is not saved, save the usage scenario type of the user to the memory, and update the preset policy according to the usage scenario type of the user.

14. The apparatus according to claim 10, wherein the apparatus further comprises an obtaining module, configured to obtain the usage scenario information of the user using the wearable device in the wearable device set of the user.

15. The apparatus according to claim 10, wherein:

the processor is further configured to: detect the wearable device set of the user, so as to determine whether the wearable device set of the user changes; and if a wearable device in the wearable device set of the user changes, determine, according to the usage scenario type of the user and the preset policy, the first interactive device from the detected wearable device set of the user, wherein the first interactive device is a wearable device in the detected wearable device set of the user that matches the usage scenario type of the user.

16. The apparatus according to claim 10, wherein:

the processor is further configured to: determine whether the first interactive device is the same device as a second interactive device; and if the first interactive device and the second interactive device are not the same device, trigger the transmitter to send the attribute information of the first interactive device to all other wearable devices in the wearable device set of the user, wherein the second interactive device is an interactive device determined according to a previous usage scenario type of the user.

17. The apparatus according to claim 10, wherein that the processor is configured to determine a first interactive device comprises that the processor is configured to:

determine the priority sequence of all wearable devices in the wearable device set of the user according to the usage scenario type of the user and the preset policy; and determine, from the wearable device set of the user, the first interactive device according to the priority sequence.

18. The apparatus according to claim 10, wherein the apparatus further comprises a receiver, configured to receive a query request sent by at least one wearable device in the wearable device set of the user, wherein the query request is used to query the attribute information of the first interactive device; and the transmitter is further configured to send the attribute information of the first interactive device to the at least one wearable device according to the query request.

* * * * *